Patented July 5, 1932

1,865,799

UNITED STATES PATENT OFFICE

CHARLES J. STOWIE, OF OAKLAND, CALIFORNIA

ENAMEL REMOVER

No Drawing.   Application filed April 26, 1930. Serial No. 447,781.

The invention is for an enamel remover.

The object of the invention is to provide a preparation, which by application to an enameled surface will cause the enamel to peel away from the surface to which it is applied without liquefaction, retaining its inherent tenacity while losing its cohesive properties.

Another object of the invention is to provide an enamel remover of the class outlined which will not be injurious to the base or surface on which the enamel is applied, and which by destroying the cohesive force between the enamel and the applied surface causes the enamel to completely free itself thereby providing a clean surface.

A further object of the invention is to provide an enamel remover as previously outlined which acts quickly, reducing thereby the time and labor required for removing enamel by means at present disposal.

Other objects of the invention will become apparent as the description is set forth, as also from the appended claim.

The invention consists primarily of a liquid or semi-liquid preparation which may be applied by means of a brush or swab to enameled surfaces, such as automobile bodies and fenders, traction car plates, furniture and other enameled surfaces, and which acts practically instantly in loosening the enamel from the surface to which it is applied, and consists of a mixture of benzol, a lower alcohol which includes wood, grain, or denatured alcohol, acetone, nitric acid, an oil soluble in the mixture, and a flow restraining agent. "Monopole" oil which is a sulphonated castor oil is found to be very satisfactory, although any mineral or vegetable oil which is dispersible in the mixture may be used. It is preferred to use ordinary yellow beeswax as a flow restraining agent, although fine saw dust or other materials may be used. The flow restraining agent is added mainly for the purpose of preventing excessive creep of the liquid due to its low specific gravity. Nitric acid has been found the most satisfactory and efficient of the various acids. The alcohol and acetone should preferably be non-aqueous, so as to provide a substantially non-aqueous mixture for highest efficiency, altho for commercial purposes, commercial substances may be used, bearing in mind that the more nearly non-aqueous the mixture, the more efficiently and quickly it operates.

I prefer to use ingredients of the following standards and proportions, by weight: benzol 90° Bé., 50 parts; grain or wood alcohol, absolute, 25 parts; acetone, commercial, 10 parts; "monopole" oil, 5 parts; nitric acid U. S. P., 10 parts; yellow beeswax, 1 part. Variations of approximately ten percent plus or minus in any of the ingredients does not materially affect the ultimate results.

The benzol, alcohol and acetone are first mixed together, after which the nitric acid, following with the "monopole" oil, and after complete admixture, adding the beeswax which is dissolved therein, reducing the fluidity of the mixture.

In use, the mixture is applied by means of a brush or swab to the enamel which it almost immediately penetrates, destroying the cohesion between the enamel and the base surface, slightly swelling the enamel, without destroying the inherent cohesion, so as to permit bodily removal of the enamel from the surface. Contact with the skin of the operator has no injurious effects, in fact, the opposite result has been noted. The mixture is also applicable to the removal of varnishes and paints, and provides a particularly efficient cleaner for preparing motor vehicles for repainting or re-enameling.

It will be noted that variations in compounds and proportions may be resorted to without detracting from the spirit or scope of the invention or sacrificing any of the advantages thereof, where such variations are consistent with the previous description and with the appended claim.

I claim:

An enamel remover comprising, by weight benzol 90° Baumé, 50 parts; grain or wood alcohol, 190 to 200 proof, 25 parts; acetone, commercial, 10 parts; nitric acid, U. S. P., 10 parts; "monopole" oil, 5 parts; beeswax, 1 part.

In testimony whereof I have affixed my signature.

CHARLES J. STOWIE.